United States Patent [19]
Kraus

[11] 3,734,318
[45] May 22, 1973

[54] GARBAGE COLLECTION VEHICLE

[75] Inventor: Johann Kraus, Kissing, near Augsburg, Germany

[73] Assignee: Keller & Knappich GmbH, Augsburg, Germany

[22] Filed: Mar. 31, 1971

[21] Appl. No.: 129,732

Related U.S. Application Data

[63] Continuation-in-part of Ser. No. 821,354, May 2, 1967, abandoned.

[52] U.S. Cl............214/83.14, 198/7 BL, 214/83.26, 214/521
[51] Int. Cl............B60p 1/36, B65g 65/20
[58] Field of Search..................214/83.14, 83.26, 214/520, 521, 522; 198/7 BL, 7 R, 8, 9

[56] References Cited

UNITED STATES PATENTS

| | | | |
|---|---|---|---|
| 3,575,310 | 4/1971 | Albertson | 214/522 |
| 1,570,256 | 1/1926 | Hunt | 198/7 BL X |
| 2,575,729 | 11/1951 | Radakovich | 214/521 X |
| 3,011,273 | 12/1961 | Stumpf | 198/7 R X |

FOREIGN PATENTS OR APPLICATIONS

| | | | |
|---|---|---|---|
| 1,920,857 | 4/1969 | Germany | 214/521 |

*Primary Examiner*—Albert J. Makay
*Attorney*—Allison C. Collard

[57] ABSTRACT

A garbage collection vehicle having a conveyor means mounted on a cantilever arm which is secured adjacent to the driver's cab of the vehicle, for transporting disposable garbage containers from ground level to a garbage collection receptacle mounted on the rear of the vehicle. A disposal frame is mounted on the front end of the cantilever and includes guiding means mounted on the frame for guiding the containers into the disposal frame, and a cross wheel rotatably mounted on the frame for engaging and pushing the containers onto the conveyor means.

3 Claims, 3 Drawing Figures

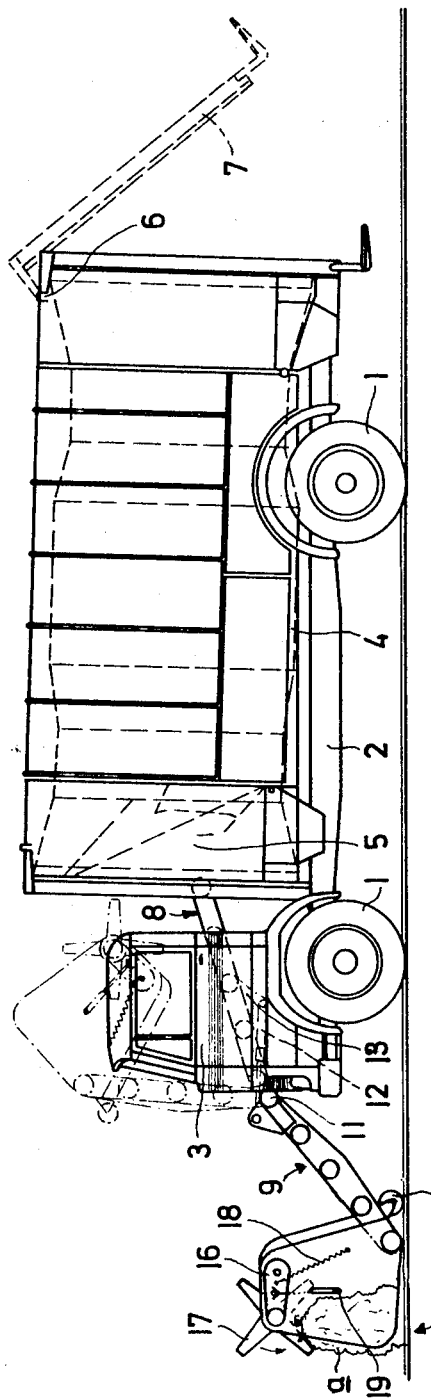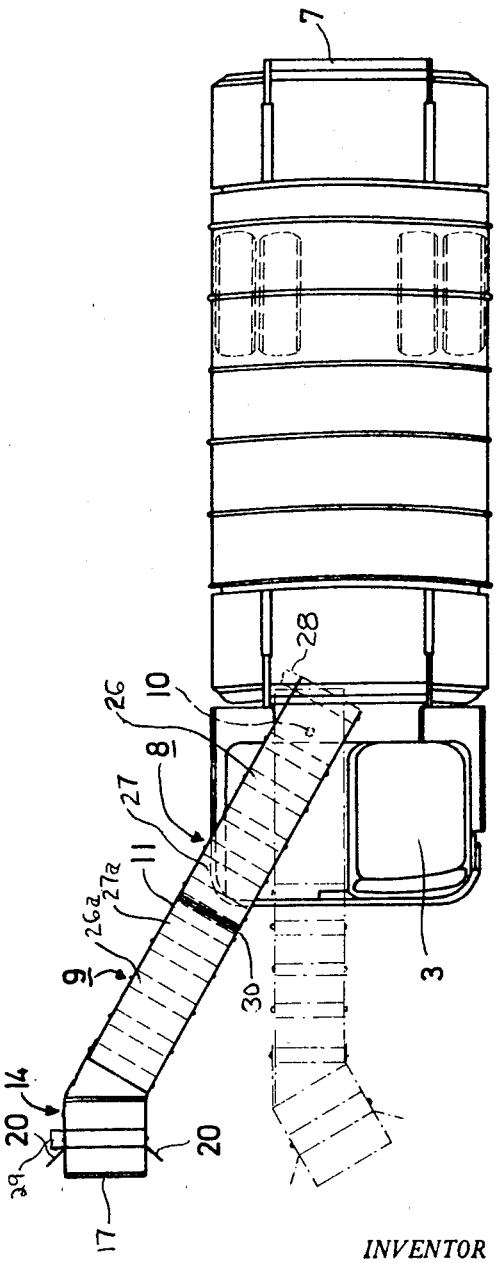

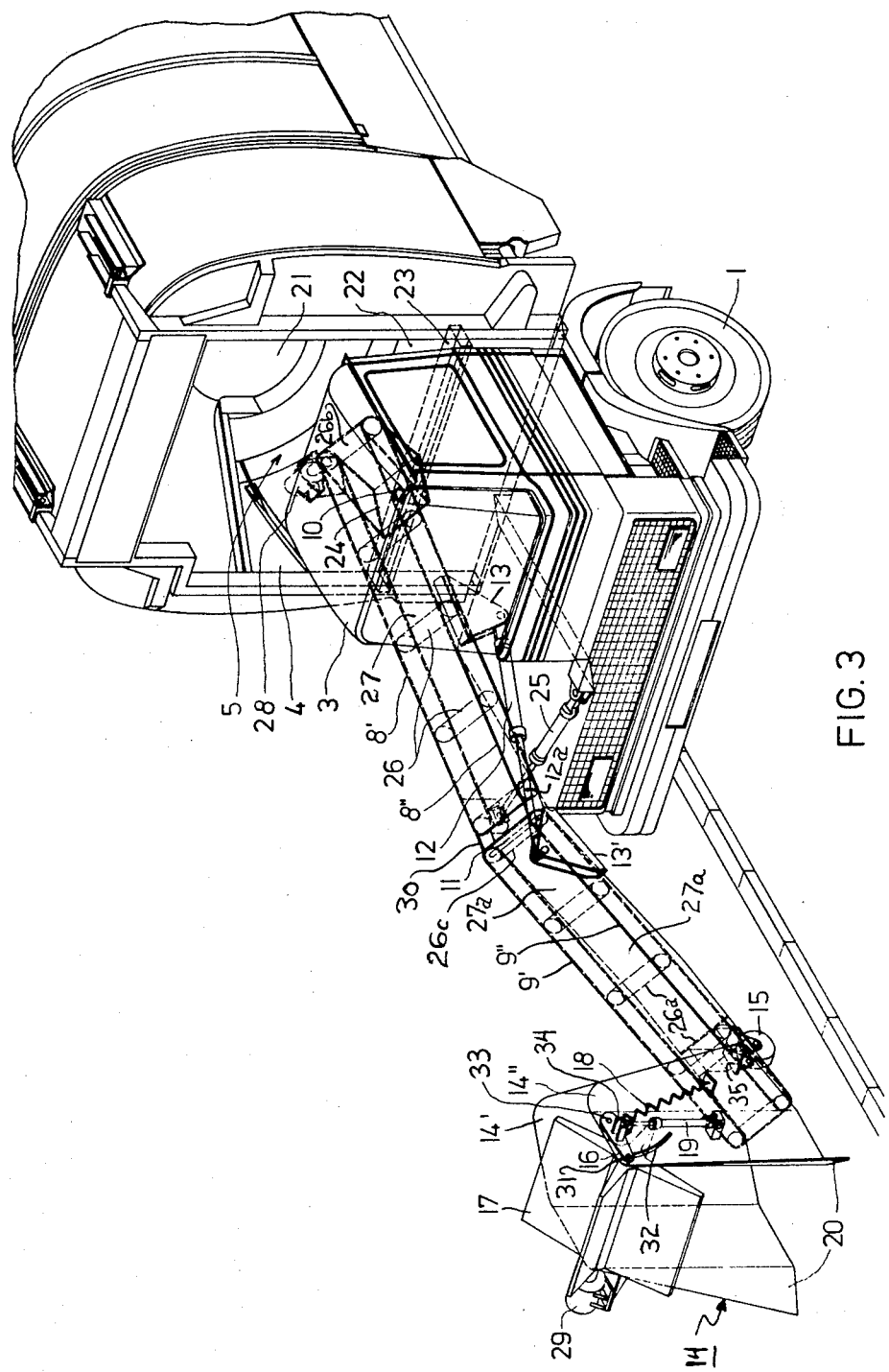

GARBAGE COLLECTION VEHICLE

This application is a continuation-in-part of application Ser. No. 821,354 filed May 2, 1969, entitled "GARBAGE COLLECTION VEHICLE", now abandoned.

The present invention relates to a garbage collecting vehicle, and in particular, to a garbage collecting vehicle having a conveyor belt mounted on a cantilever arm disposed on one side of the driver's cab which feeds disposable garbage containers to a garbage input opening located behind the driver's cab on the vehicle.

In conventional garbage collecting vehicles, a pair of gripping arms are mounted adjacent to the driver's cab and are extended radially from the vehicle to engage the lower side of garbage can handles. The gripping arms lift the garbage cans and empty their contents into a funnel mounted on the garbage collecting vehicle. In this type of vehicle, it is difficult and cumbersome to engage the handles of the garbage cans in a safe and secure manner. The vehicle also requires that the garbage can handles be constructed so that they can be securely gripped by the arms. Furthermore, the garbage cans must be lifted onto the garbage collecting vehicle, emptied, and then be returned back to ground level. This type of operation is time consuming.

Accordingly, the present invention overcomes the previously mentioned disadvantages by providing a garbage collecting vehicle with a conveyor means mounted on a cantilever for conveying disposable garbage containers onto the garbage collecting vehicle. In the present invention, the loading device for the garbage vehicle consists of a conveyor belt mounted on the cantilever arm. A disposal frame, mounted on roller wheels, and carrying a rotating cross wheel for engaging and pushing the disposable garbage containers onto the conveyor, is located at the front end of the cantilever arm. The placing of the garbage containers on the conveyor is accomplished easily, and is not time consuming, since the garbage collecting vehicle is moved continuously during the collecting operation. The rotating cross wheel is vertically adjustable so that the driver can easily adjust the wheel position to accommodate different heights of garbage containers. A garbage collecting vehicle of this type requires only a single operator for driving and loading the vehicle, and thereby results in a substantial manpower savings.

The cantilever arm is pivotably arranged on a fixed axis in order to permit easy pickup of garbage containers which are placed at a remote distance from the curbstone of the sidewalk. This type of arrangement also permits the entire cantilever arm to be pivoted flush with respect to the profile of the garbage collecting vehicle while the vehicle is in transit. The cantilever arm is comprised of two portions, a front and a rear portion, which carry separate conveyor belts. The front portion of the conveyor belt is pivotable vertically on a horizontal axis in order to enable the driver to retract the disposal frame and front portion of the conveyor to a position adjacent to the driver's cab while the vehicle is in transit.

In order to facilitate easy placing of the disposable containers on the conveyor, the disposal frame is provided with guiding means disposed on the front edges thereof for guiding the garbage containers into the disposal frame where the cross wheel may push the containers onto the conveyor belt.

It is therefore an object according to the present invention to provide a garbage collection vehicle for collecting disposable garbage containers having a conveyor belt and disposal frame mounted on a cantilever arm adjacent to the driver's cab of the vehicle for conveying the garbage containers into the collecting receptacle of the vehicle.

It is also an object according to the present invention to provide a garbage collection vehicle which is simple in design, inexpensive to manufacture, and reliable and efficient in operation.

Other objects and features of the present invention will become apparent from the following detailed description considered in connection with the accompanying drawings which disclose several embodiments of the invention. It should be understood, however, that the drawings are designed for the purpose of illustration only, and not as a definition of the limits of the invention.

In the drawings, wherein similar reference characters denote similar elements throughout the several views:

FIG. 1 is a longitudinal side view of a garbage collecting vehicle constructed in accordance with the present invention;

FIG. 2 is a top plan view of the garbage collecting vehicle shown in FIG. 3; and FIG. 3 is a detailed front perspective view of a second embodiment of a garbage collecting vehicle constructed in accordance with the present invention.

Referring to FIGS. 1–3, there is shown a garbage collecting vehicle having frame 2 which is mounted on wheels 1 and carries driver cab 3 and garbage collecting container 4. Container 4 is in the form of a rotating drum (see FIG. 3) at the front of which is disposed a charging or loading opening 22 and conical insert 21 for guiding the garbage into the receptacle.

At the opposite end of the vehicle, the garbage collecting container is provided with rear cover 7 which may be moved upwardly around axis 6 for emptying the garbage in a garbage dump. It should be noted that this operation is also done by the driver without his leaving the vehicle.

On one side of the driver cab 3, a cantilever arm consisting of rear portion 8 and front portion 9 is rigidly mounted on pivotable mounting means 24. Transverse bar 23 is disposed in front of charging opening 22 and serves as a support for mounting means 24 which is affixed pivotably to bar 23 on fixed axis 10. Pivotable mounting means 24 enables the cantilever arm to assume a position flush with the profile of the vehicle when the garbage collecting vehicle is in transit, as illustrated by the dotted lines in FIG. 2.

Rear portion 8 of the cantilever arm consists of a pair of rigid members 8' and 8" which are rigidly affixed to mounting means 24. Between members 8' and 8" are disposed rollers 26 which support a conveyor belt 27. Rollers 26 are disposed over central core members (not shown) which are structural cross members coupling members 8' and 8" together so as to provide a rigid ladder-like structure. Motor 28 is mounted on mounting means 24 and is coupled to roller 26b in order to drive conveyor belt 27. The front portion of the cantilever arm is constructed similarly to rear portion 8 and consists of rigid members 9' and 9" attached to rear portion 8 by means of members 30 and pivotable with respect to rear portion 8 about axis 11. Members 30 are merely extensions of rigid members 8' and 8" of rear portion 8. Rollers 26a of front portion 9 have central core members (not shown) similar to those provided in rear portion 8, over which rollers 26a are disposed for coupling members 9' and 9'' together and providing the illustrated structural configuration. Front portion 9 has a conveyor belt 27a disposed over rollers 26a and has roller 26c coupled to the drive mechanism of motor 28 by any suitable arrangement, for example, direct coupling, a belt and pulley arrangement, or a gear drive.

A hydraulic cylinder 25 is provided for pivoting the cantilever arm laterally about axis 10. One end of cylinder 25 is rigidly affixed to portion 8' and the other end is affixed to driver's cab 3 as shown in FIG. 3. In this way, adjustment of the lateral position of the cantilever arm is provided.

In addition to lateral pivotable movement, front portion 9 of the cantilever army may be moved in upward and downward horizontal direction about axis 11. This movement is provided by hydraulic cylinder 12 which coupled pivotably at one end to shoulder 13 which is rigidly affixed to member 8'' and the other end on shoulder 13' which is rigidly affixed to member 9''. When rod 19a of hydraulic cylinder 12 is extended, front portion 9 of the cantilever arm will engage the ground with roller 15 which is rigidly mounted on members 9' and 9''. When the rod is retracted, front portion 9 is pivoted upwardly about axis 11 to the position shown in FIG. 1 indicated by the dotted lines. During the pivoting motion of front portion 9, rear portion 8 remains fixed in its position. The position of front portion 9 of the cantilever arm is controlled by hydraulic cylinder 12 and may be positioned so as to rest upon the ground on roller 15, as previously stated, and thus help to support the rear position of the cantilever arm, or it may be held above the ground as desired by means of suitable adjustment of hydraulic cylinder 12. With this type of arrangement, the front portion 9 of the cantilever arm may be lifted upwardly about axis 11, thus providing storage of the frame disposal and the front part of the cantilever arm while the operator is driving.

Mounted on front portion 9 of the cantilever arm is disposal frame 14 consisting of two side walls 14' and 14''. Side wall 14' is rigidly affixed to member 9' and side wall 14'' is rigidly affixed to member 9''. Frame 14 does not have a bottom plate, front or rear walls, or a top portion. It consists merely of side walls 14' and 14''. Between side walls 14' and 14'' is mounted cross wheel 17 which is mounted on axle 31 which is pivotably mounted in arms 16. Axle 31 is disposed through a longitudinal curved slot 32 provided in the side walls, so that the axle may be moved by arms 16 up and down within the slot. Arms 16 are pivotably mounted on the outside of side walls 14' and 14'' about axis 33. Movement of arms 16 and cross wheel 17 within slot 22 is achieved by means of hydraulic unit 19 which is pivotably affixed at one end to side wall 14' and at the other end to mounting means 34 affixed to side arm 16. Hydraulic unit 19, like the other hydraulic units, is remotely controlled by the driver so that the height of the cross wheel with respect to the ground may be adjusted at any particular time. While the containers are being collected, the cross wheel is adjusted so that the containers are engaged from above to insure that the containers will not be pushed over by the cross wheel. Spring means 18 is affixed at one end to side wall 14'' and at the other end to arms 16 in order to facilitate easy return of the cross wheel to its lowest point in slot 32 and help retraction of the piston rod of hydraulic unit 19.

Rotation of cross wheel is achieved by motor 29 which is rigidly mounted on arm 16 and coupled to the cross wheel 17 and axle 30 by any suitable means, such as those previously described. Disposal frame 14 is also provided with guiding means 20, shown in FIGS. 2 and 3, mounted on the front edges of side walls 14' and 14'' in order to facilitate easy guiding of the garbage containers into the disposal frame during collection.

It should be noted that motors 28 and 29, and hydraulic units 12, 25 and 19, are all preferably controlled remotely from the driver's cab of the vehicle. In this way, the numerous adjustments that must be made during garbage collection may be made without difficulty and without consuming excessive time.

In operation, during transit of the vehicle to the garbage collecting area, the cantilever arm of the vehicle is pivoted parallel to the longitudinal axis of the vehicle close to driver's cab 3 by means of hydraulic cylinder 25. Front portion 9 of the conveyor of the cantilever arm is positioned in its vertically upward position by hydraulic cylinder 12 as shown in the dotted lines of FIG. 1.

For collecting the garbage, front portion 9 of the cantilever arm is extended by hydraulic cylinder 12 until roller 15 engages the ground. Roller 15 is pivotable about its rigid mounting 35 so that after front portion 9 has been extended and roller 15 engages the ground, the cantilever arm may be pivoted laterally with respect to the vehicle about axis 10 as shown in FIG. 2.

The garbage to be collected is packed in disposable bags a which are constructed of paper or plastic. The bags are positioned on the sidewalk or at the curb of the street, and the vehicle moves slowly along the street adjacent the curb pivoting the cantilever arm laterally with respect to the moving vehicle according to the position of the bags. As stated previously, this lateral pivoting movement of the cantilever arm is accomplished by controlling hydraulic cylinder 25. Bags a are guided between walls 14' and 14'' of frame 14 by guiding means 20 which are disposed at angles to the front of frame 14 giving the frame a funnel-like shape.

During collection of the garbage bags, conveyor belts 27 and 27a are kept in constant movement by switching on motor 28. The conveyor belts run on rollers 26 and 26a and are retained between the side walls of members 8' and 8'' of portion 8 and side walls of members 9' and 9'' of portion 9. These side walls also help to keep the disposable bags on the conveyor belts as they are conveyed up the cantilever arm to the vehicle container opening. Cross wheel 17 is also kept in constant rotating movement by hydraulic motor 29. The speed of cross wheel 17 is adjusted by the operator so that the circumferential speed of the cross wheel, i.e., the speed of the outer edges of the individual cross bars, is greater than the driving speed of the vehicle. This will insure that bags a are moved between walls 14' and 14'' by cross wheel 17 and are pushed rearwardly onto conveyor belt 27a. Keeping the speed of cross wheel 17 greater than that of the moving vehicle prevents the bags from being pushed backwardly over into the street and from falling off the conveyor belt. As stated previously, cross wheel 17 is adjustable vertically in order to compensate for the different heights of disposable containers a.

The disposable containers are then moved from conveyor belt 27a up front portion 9 of the cantilever arm onto conveyor belt 27 of rear portion 8 to the upper edge thereof where they fall from the conveyor belt into charging opening 22 of loading means 5. Loading means 5 then transfers the containers into receptacle 4. It is preferable that container 4 be provided with some means to tear open the containers so that the collected garbage may be compressed in container 4 without having air bubbles disposed therein.

While only several embodiments of the present invention have been shown and described, it will be understood that many changes and modifications may be made thereunto without departing from the spirit and scope of the invention.

What is claimed is:

1. In a garbage collection vehicle, apparatus for transporting disposable garbage containers from ground level to a garbage collection container mounted on the vehicle, comprising:

a cantilever arm, laterally pivotably mounted on the vehicle, and including a first portion pivotably affixed to the vehicle, and a second portion pivotably coupled to said first portion and vertically moveable with respect thereto, said first portion having at least one roller wheel pivotably affixed thereto for supporting said cantilever arm upon engagement with the ground;

a conveyor, mounted on said cantilever arm, for conveying the disposable garbage containers to the garbage collection container mounted on the vehicle;

a frame, having at least two side walls, mounted on the end of said second portion of said cantilever arm, for guiding the disposable containers onto said conveyor; and a rotatable cross-wheel, mounted on and between the side walls of said frame, and spanning the width thereof, for engaging and pushing the disposable garbage containers onto said conveyor.

2. The garbage collection vehicle as described in claim 1, wherein said rotatable cross wheel is mounted on an axle coupled to a pair of mounting arms pivotably affixed to the side walls of the frame so that said rotatable cross wheel is vertically adjustable so as to accommodate varying heights of disposable containers during collection.

3. The garbage collection vehicle as described in claim 2, wherein said frame further comprises guiding means rigidly affixed to the side walls of said frame and disposed at angles thereto for guiding containers into the frame disposal.

\* \* \* \* \*